(12) United States Patent
Jing et al.

(10) Patent No.: US 12,027,962 B2
(45) Date of Patent: Jul. 2, 2024

(54) LOAD REGULATION

(71) Applicant: TEXAS INSTRUMENTS INCORPORATED, Dallas, TX (US)

(72) Inventors: Weibing Jing, Beijing (CN); Qi Yang, Beijing (CN); Dan Li, Beijing (CN); Guoyang Wu, Beijing (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 365 days.

(21) Appl. No.: 17/565,550

(22) Filed: Dec. 30, 2021

(65) Prior Publication Data
US 2022/0247301 A1    Aug. 4, 2022

Related U.S. Application Data

(60) Provisional application No. 63/145,271, filed on Feb. 3, 2021.

(51) Int. Cl.
*H02M 3/158* (2006.01)
*H02M 1/00* (2006.01)

(52) U.S. Cl.
CPC ......... *H02M 1/0045* (2021.05); *H02M 3/158* (2013.01)

(58) Field of Classification Search
CPC .......................................... H02M 3/155–1588
See application file for complete search history.

(56) References Cited

U.S. PATENT DOCUMENTS

| | | | |
|---|---|---|---|
| 4,584,568 A | 4/1986 | Zomorrodi | |
| 4,794,506 A | 12/1988 | Hino et al. | |
| 4,891,746 A | 1/1990 | Bowman et al. | |
| 5,043,859 A | 8/1991 | Korman et al. | |
| 5,889,828 A | 3/1999 | Miyashita et al. | |
| 7,218,086 B1* | 5/2007 | Ritter | H05B 45/38 323/299 |
| 7,969,127 B1* | 6/2011 | Megaw | G05F 1/613 323/901 |
| 10,069,350 B2 | 9/2018 | Stevens et al. | |
| 10,759,443 B2 | 9/2020 | Xing et al. | |
| 2004/0124935 A1 | 7/2004 | Fayneh et al. | |
| 2012/0001611 A1* | 1/2012 | Sato | H02M 1/32 323/299 |
| 2020/0412354 A1 | 12/2020 | Morand et al. | |

* cited by examiner

*Primary Examiner* — Peter M Novak
(74) *Attorney, Agent, or Firm* — Charles F. Koch; Frank D. Cimino

(57) ABSTRACT

A device includes an operational amplifier having a first input, a second input and an output, the operational amplifier configured to generate a first signal at the output. The device includes a reference resistor divider having a first and second resistor, a first terminal of the first resistor coupled to the second input of the operational amplifier. A second terminal of the first resistor is coupled to a first terminal of the second resistor and a second terminal of the second resistor coupled to an electrically neutral terminal. The device includes a voltage to current (V2I) converter having an input and an output, the input coupled to the output of the operational amplifier, and the V2I converter configured to generate a second signal at the output of the V2I converter. The device includes a switch coupled to the output of the V2I converter and to the reference resistor divider.

20 Claims, 6 Drawing Sheets

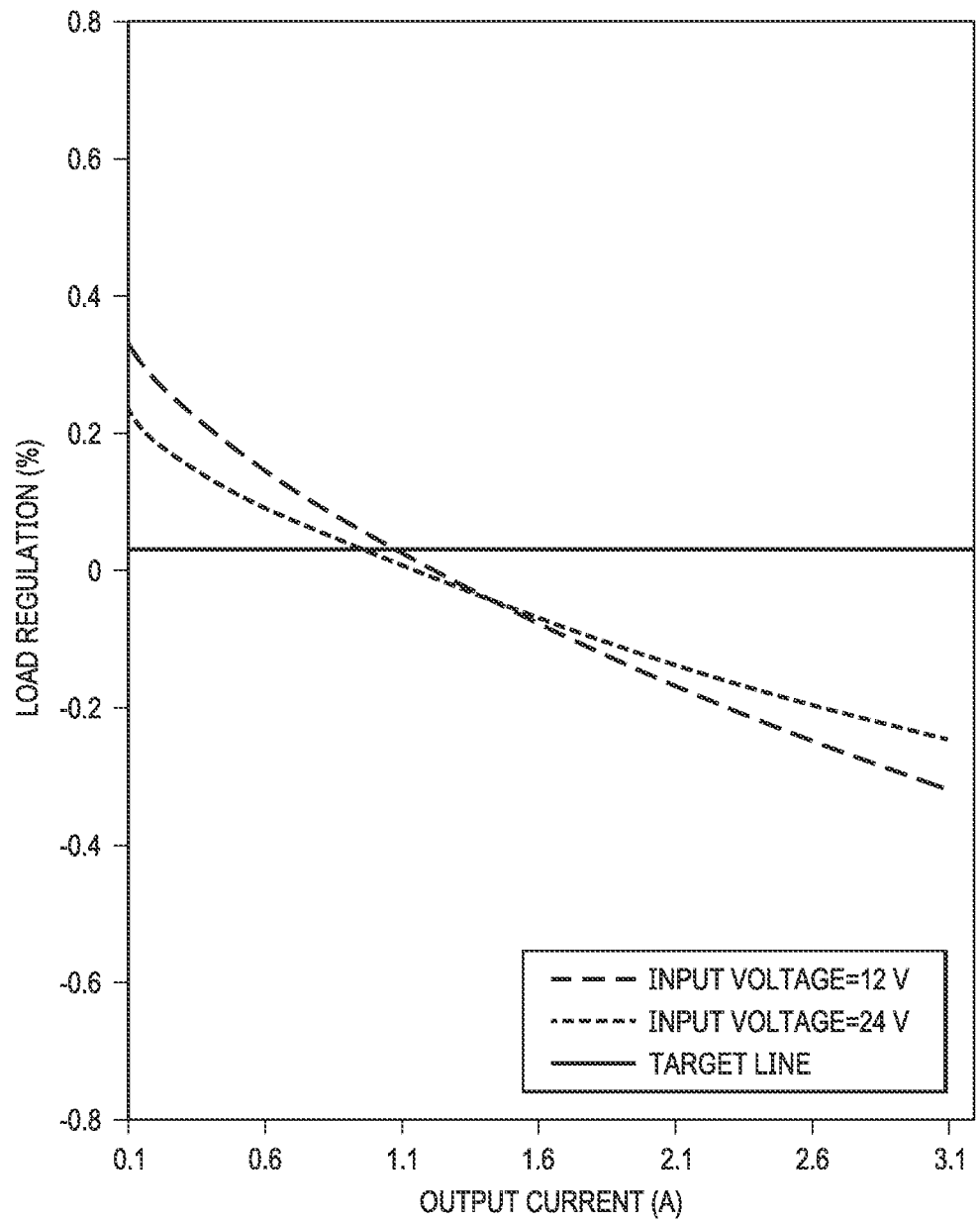

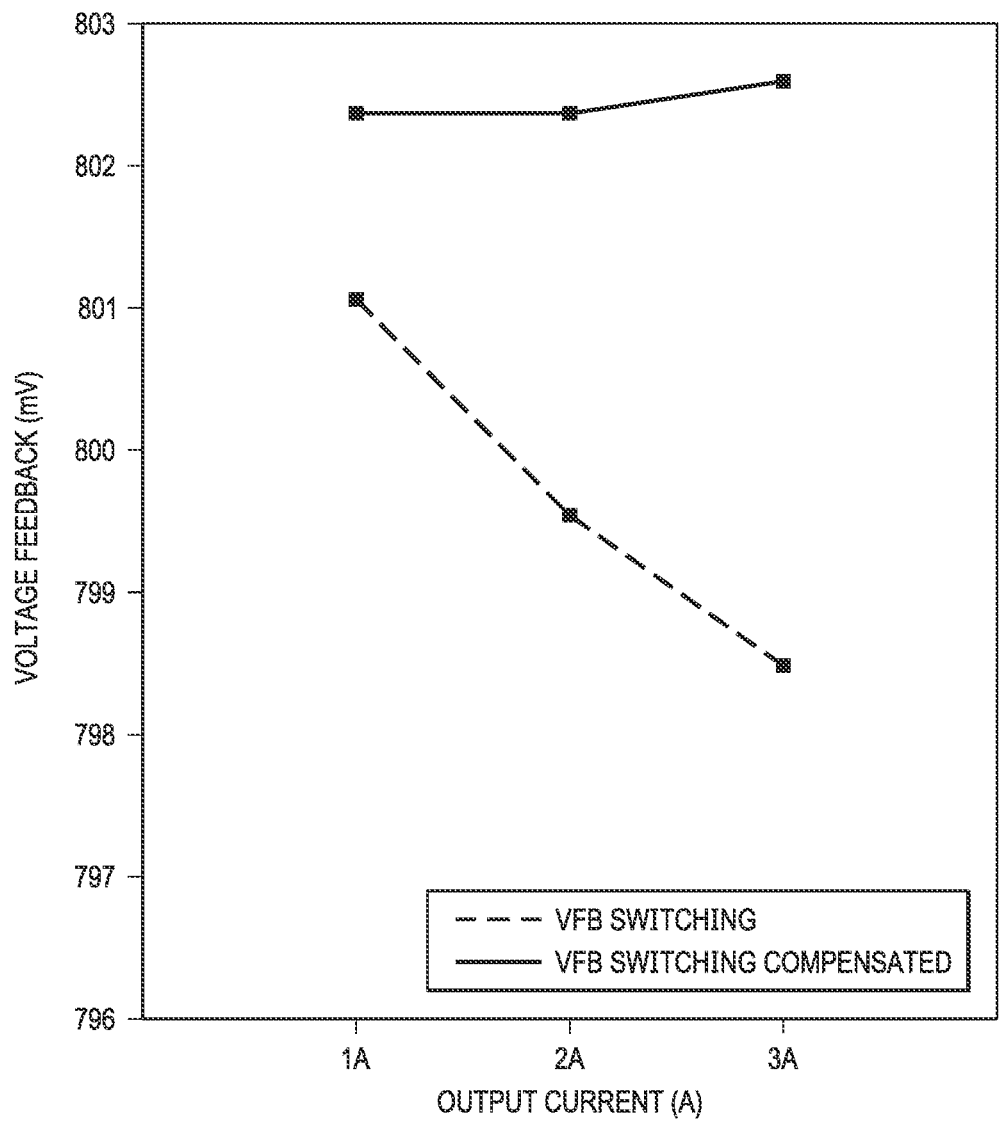

LOAD REGULATION

CROSS-REFERENCE TO RELATED APPLICATION

This application claims the benefit of priority to U.S. Provisional Application No. 63/145,271, filed on 3 Feb. 2021 the entirety of which is herein incorporated by reference.

TECHNICAL FIELD

This relates generally to electronic circuitry, and more particularly to circuit that implements load regulation.

BACKGROUND

A voltage reference circuit is an electronic device that produces a nearly constant voltage irrespective of a loading on the device, power supply variations, temperature changes, and the passage of time. Voltage references are used in power supplies, analog-to-digital converters, digital-to-analog converters, and other measurement and control systems.

Load regulation refers to the ability to maintain a constant voltage output from a power supply despite changes or variability in a load. Without load regulation, the output voltage can drop suddenly when an electric load increases, or surge suddenly when the electrical load decreases. Load regulation can be achieved with a linear regulator, which can function like a variable resistor. For example, linear regulators can dissipate surges in the input voltage as waste heat to ensure a constant output voltage. Also, a switch mode power supply can be employed to regulate voltage, as well as rectify alternating current (AC) power to produce direct current (DC) power.

SUMMARY

In a first example, a device includes an operational amplifier having a first input, a second input and an output, the first input adapted to be coupled to a first terminal, and the operational amplifier configured to generate a first signal at the output. The device further includes a reference resistor divider having a first resistor and a second resistor, a first terminal of the first resistor is coupled to the second input of the operational amplifier. A second terminal of the first resistor is coupled to a first terminal of the second resistor and a second terminal of the second resistor coupled to an electrically neutral terminal. Also, the device includes a voltage to current (V2I) converter having an input and an output, the input coupled to the output of the operational amplifier. The V2I converter is configured to generate a second signal at the output of the V2I converter. Further, the device includes a switch coupled to the output of the V2I converter and to the second terminal of the first resistor of the reference resistor divider. Moreover, the device further includes a bandgap voltage reference (VBG) source having a negative terminal coupled to the electrically neutral terminal and a positive terminal coupled to the second input of the operational amplifier.

In a second example, a device includes an operational amplifier that further includes a first input configured to receive a voltage feedback signal. The operational amplifier also has a second input coupled to a voltage reference terminal and configured to receive a reference voltage. Further, the operational amplifier is configured to generate an error compensation voltage at an output of the operational amplifier, responsive to the voltage feedback signal and the reference voltage. Also, the device includes a reference resistor divider having a first terminal of a first resistor coupled to the voltage reference terminal and a second terminal of the first resistor coupled to a reference resistor divider terminal. The resistor divider also has a first terminal of a second resistor coupled to an analog ground (AGND) terminal and a second terminal of the second resistor coupled to the reference resistor divider terminal. Moreover, the device includes a voltage to current (V2I) converter configured to receive the error compensation voltage and to convert the error compensation voltage into an error compensation current. Further, the device includes a switch coupled between the V2I converter and the second terminal of the first resistor of the resistor divider. The switch is configured to intermittently inject the error compensation current into the second terminal of the first resistor of the resistor divider based on a control signal. Also, the device includes a bandgap voltage reference (VBG) source configured to generate the reference voltage.

In a third example, a device includes a reference voltage compensator that further includes an operational amplifier. The operational amplifier has a first input, a second input and an output, the first input adapted to be coupled to a first terminal, and the operational amplifier configured to generate a first signal at the output. The reference voltage compensator further includes a reference resistor divider having a first resistor and a second resistor. A first terminal of the first resistor is coupled to the second input of the operational amplifier and a second terminal of the first resistor is coupled to a first terminal of a second resistor. A second terminal of the second resistor coupled to an electrically neutral terminal. Also, the reference voltage compensator includes a voltage to current (V2I) converter having an input and an output, the input coupled to the output of the operational amplifier. The V2I converter is configured to generate a second signal at the output of the V2I converter. Moreover, the reference voltage compensator includes a switch coupled to the output of the V2I converter and to the second terminal of the first resistor of the reference resistor divider. A control terminal of the switch is configured to receive a control signal to control a state of the switch. Furthermore, the reference voltage compensator includes a bandgap voltage reference (VBG) source having a negative terminal coupled to the electrically neutral terminal a positive terminal coupled to the second input of the operational amplifier. Also, the device further includes a logic power stage that includes a controller a controller. The logic power stage also includes a high-side field effect transistor (FET) controlled by the controller having an input coupled to a power supply and an output. Further, the logic power stage includes a low-side FET controlled by the controller having an input coupled to the output of the high-side FET and an output coupled to the electrically neutral terminal. The control terminal of the switch is coupled to a control terminal of the low-side FET to receive the control signal from the controller.

BRIEF DESCRIPTION OF THE DRAWINGS

FIG. 5 illustrates a graph that plots load regulation, in percentage (%) as a function of output current, in amperes (A).

FIG. 6 illustrates a graph that plots Voltage Feedback (VFB), in millivolts (mV) as a function of output current, in Amperes (A).

DETAILED DESCRIPTION

A reference voltage compensator is a circuit used to improve load regulation in a current mode switching regulator. Particularly, a reference voltage compensator is applied to a current mode switching regulator to regulate output voltage of the current mode switching regulator by compensating a reference voltage. More specifically, a voltage to current (V2I) converter converts an error compensation voltage to an error compensation current. Also, the V2I converter is coupled to a voltage controlled switch that intermittently injects the error compensation current into a reference resistor divider. By injecting the error compensation current into the reference resistor divider, the reference voltage is adjusted during intervals where the switch is closed. Thus, the reference voltage compensator adjusts the reference voltage based on the error compensation voltage.

Also, current mode switching regulators have pin account limitations. Accordingly, in some examples, parts of a current mode switching regulator share a common pin connected to an analog ground and power ground, such as a reference voltage divider and a load. Thus, parasitic resistance on the common pin creates a voltage drop that reduces the reference voltage. In response, a voltage drop on the output of the current mode switching regulator occurs due to the reduced reference voltage. Current mode switching regulators cannot correct the voltage drop of the output voltage because the reference voltage is shifted by the parasitic resistance. However, converting the error compensation voltage to the error compensation current enables the reference voltage compensator to adjust the reference voltage by intermittently injecting the error compensation current into the reference resistor divider that adjusts the reference voltage.

More specifically, the error compensation voltage is proportional to the output current of the current mode switching regulator, so the error compensation current (generated by the V2I converter) is also proportional to the output of the current mode switching regulator. Further, in current mode switching regulators, the error compensation voltage is nearly equal to a voltage across an inductor coupled to the output of the current mode switching regulator. In some examples, a voltage drop on the output voltage of the current mode switching regulator occurs when a when a low-side field effect transistor (FET) that is coupled to the common pin has an on state. Accordingly, the switch of the reference voltage compensator is turned on to adjust the reference voltage when the low-side FET is turned on. Conversely, the switch of the reference voltage compensator is opened to adjust the reference voltage when the low-side FET is turned off.

Figure 1:
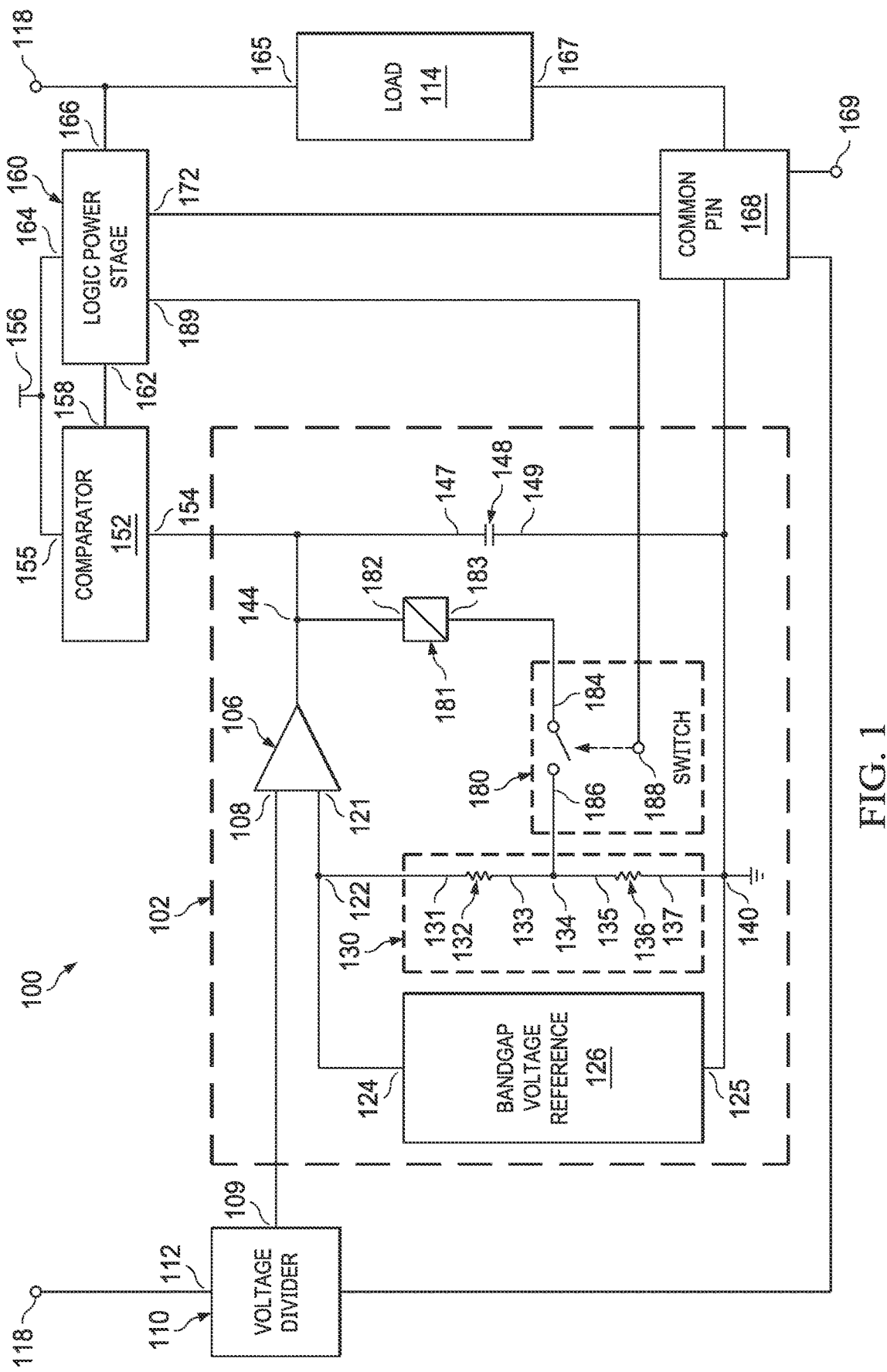
FIG. 1 is a block diagram of a converter with a reference voltage compensator.

FIG. 1 illustrates a block diagram of a power converter 100. The power converter 100 is a direct current (DC)-to-DC converter, such as a buck converter, a boost converter or a buck-boost converter. The power converter 100 includes a reference voltage compensator 102 that improves load regulation. The reference voltage compensator 102 includes an operational amplifier 106. The operational amplifier 106 includes a first input 108 that is adapted to be coupled to an output 109 of a voltage divider 110. The voltage divider 110 further includes a first input 112 adapted to be coupled to a load 114 via an output voltage terminal 118, so the output of the voltage divider 110 is a voltage feedback signal (e.g., VFB voltage). The output voltage terminal 118 provides the voltage divider 110 with an output voltage characterizing voltage across the load 114. Thus, the first input 108 of the operational amplifier 106 is configured to receive the VFB voltage from the voltage divider 110. Also, the operational amplifier 106 includes a second input 121 coupled to a voltage reference terminal 122. The voltage reference terminal 122 is further coupled to a positive terminal 124 of a bandgap voltage reference (e.g., VBG) 125 and a reference resistor divider 130. Particularly, the voltage reference terminal 122 is coupled to a first terminal 131 of a first resistor 132 of the reference resistor divider 130. A second terminal 133 of the first resistor 132 is coupled to a reference resistor divider terminal 134, so the reference resistor divider terminal 134 is further coupled to a first terminal 135 of a second resistor 136 of the reference resistor divider 130. Moreover, a second terminal 137 of the second resistor 136 of the reference resistor divider 130 is coupled to an analog ground (AGND) terminal 140, so the reference resistor divider 130 is coupled to both the voltage reference terminal 122 and the AGND terminal 140. Furthermore, a negative terminal 125 of the VBG 126 is coupled to the AGND terminal 140, so the VBG 126 is also coupled to both the voltage reference terminal 122 and the AGND terminal 140. That is, the VBG 126 and reference resistor divider 130 are arranged in parallel. Together, the VBG 126 and reference resistor divider 130 generate a reference voltage at the voltage reference terminal 122, so the second input 121 of the operational amplifier 106 receives the reference voltage.

The operational amplifier 106 further includes an output terminal coupled to an error compensation terminal 144. Responsive to receiving the voltage reference voltage and the VFB voltage, the operational amplifier 106 generates an error compensation voltage that is provided to the error compensation terminal 144. Furthermore, a first terminal 147 of a capacitor 148 is coupled to the error compensation terminal 144, so the capacitor 148 receives the error compensation voltage. A second terminal 149 of the capacitor is coupled to the AGND terminal 140.

Moreover, the error compensation terminal 144 and the first terminal 147 of the capacitor 148 are adapted to be coupled to a comparator 152 at a first input 154. The comparator 152 further includes a second input 155 adapted to be coupled to an input voltage terminal 156. Also, the comparator 152 further includes an output 158 adapted to be coupled to a logic power stage 160 at a first input 162. A second input 164 of the logic power stage 160 is adapted to be coupled to the input voltage terminal 156. The logic power stage 160 represents a current mode switching regulator, such as a buck converter, a boost converter, or buck-boost converter. An output 166 of the logic power stage 160 is adapted to be coupled to the output voltage terminal 118 and to a first terminal 165 of the load 114, so the first terminal 165 of the load 114 is configured to receive an output of the logic power stage 160. As noted, the first input 112 of the voltage divider 110 is also coupled to the output voltage terminal 118.

A second terminal 167 of the load 114 is coupled to a common pin 168. Due to pin account limitations, the common pin 168 is also coupled to a terminal 172 of the logic power stage 160, the second terminal 149 of the capacitor 148, the AGND terminal 140, and the voltage divider 110. Also, the common pin 168 is also coupled to a power ground (PGND) terminal 169. The PGND terminal 169 is the reference voltage of digital logic of the logic power stage 160, whereas the AGND terminal 140 is the reference voltage for the VBG 126. The PGND terminal 169 and AGND terminal 140 are electrically neutral terminals. However, the common pin 168 creates a parasitic resistance that generates a voltage drop across the common pin 168. Because the common pin 168 is coupled to the load 114 and the AGND terminal 140, the common pin 168 creates a difference between an actual voltage across the load 114 and the reference voltage proportional to the current across the load 114. Also, the VBG 126 is coupled to the AGND terminal 140, which is also coupled to the common pin 168. That is, the VBG 126 is limited to regulating the reference voltage based on voltage across the load 114 that is altered by voltage drop due to parasitic resistance across the common pin 168. Particularly, voltage drop due to parasitic resistance is proportional to the current through the load 114, so higher currents through the load renders higher voltage drops across the common pin 168. Therefore, the higher current and voltage drop, the less accurate the reference voltage will be to generate the error compensation voltage and regulate the load 114.

The reference voltage compensator 102 further includes a voltage to current (V2I) converter 181 and a switch 180. The V2I converter 181 includes an input 182 coupled to the error compensation terminal 144 to receive the error compensation voltage output by the operational amplifier 106. Responsive to receiving the error compensation voltage, the V2I converter 181 converts the error compensation voltage into error compensation current that is provided at an output 183 of the V2I converter 181. The compensation current is provided to a first input 184 of the switch 180. The switch 180 includes an output 186 that is coupled to the reference resistor divider terminal 134, so the switch 180 injects the error compensation current into the reference resistor divider 130 during intervals where the switch 180 is closed. Therefore, the switch 180 increases the reference voltage at the voltage reference terminal 122 during intervals where the switch 180 has a closed state. During intervals that the switch 180 is open, the reference voltage at the voltage reference terminal 122 is about equal to the voltage supplied by the VBG 126. Moreover, the switch 180 also includes a control terminal 188 that receives a square signal to control a state of the switch 180.

As illustrated in FIG. 1, the control terminal 188 of the switch 180 is coupled to a control terminal 189 of the logic power stage 160, which transmits a control signal that provides a square signal to control the switch 180. That is, the control terminal 188 of the switch is employed to apply a duty cycle to the error compensation current injected into the reference resistor divider 130, so the reference voltage is intermittently adjusted by controlling the switch 180. Particularly, the control signal is applied to the control terminal 188 of the switch 180 to transition the switch 180 to the closed state and increase the reference voltage at the voltage reference terminal 122. Thus, the error compensation current is employed to adjust the reference voltage to compensate for the voltage drop due to parasitic resistance at the common pin 168 during intervals where the switch 180 is closed. As described above, high current through the load 114 generates a proportionally high voltage drop across the common pin 168, which reduces the reference voltage at the voltage reference terminal 122 and impairs the ability of the compensation circuit to regulate the load 114. In some examples, a high current is created when a low-side of the logic power stage 160 is turned on, so the control terminal 189 of the logic power stage 160 transmits a control signal to the control terminal 188 of the switch that indicates the low-side of the logic power stage 160 is turned on. Accordingly, the switch 180 closes responsive to the control terminal 188 of the switch 180 receiving a control signal from a control terminal 189 of the logic power stage 160 indicating the low-side of the logic power stage 160 is on. Therefore, the reference voltage compensator 102 is employed to regulate the load 114 by compensating for voltage drop due to parasitic resistance when high current is induced by the logic power stage 160 during intervals where the low-side of the logic power stage 160 is turned on. Conversely, during intervals that a high-side of the logic power stage 160 is turned on, a low current through the load 114 generates a proportionally low voltage drop across the common pin 168. Responsive to the high-side of the logic power stage 160 being turned on, the control terminal 189 of the logic power stage 160 transmits a control signal to the control terminal 188 of the switch that indicates the low-side of the logic power stage 160 is turned off. Accordingly, the control terminal 189 of the logic power stage 160 is coupled to the control terminal 188 of the switch 180 to open the switch 180 when the high-side of the logic power stage 160 is turned on. In other examples, a square signal applied to the control terminal 188 of the switch 180 is a pulse width modulated (PWM) signal that implements a duty cycle. Particularly, the PWM signal is generated by a PWM generator.

Figure 2:
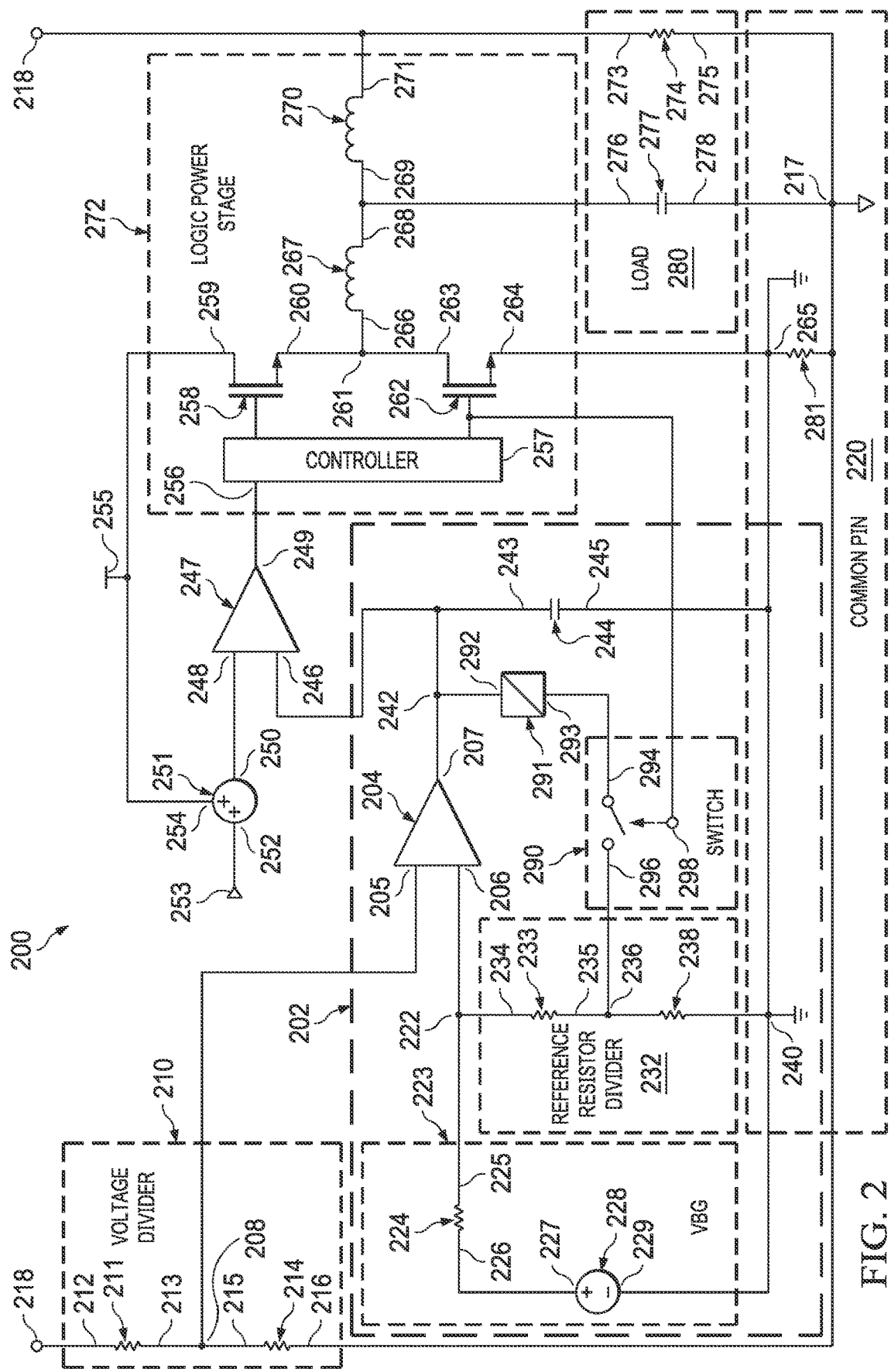
FIG. 2 is a circuit diagram of an example converter with a reference voltage compensator.

FIG. 2 illustrates an example of a circuit diagram of a power converter 200. The power converter 200 is a DC-to-DC converter, such as a buck converter, a boost converter or a buck-boost converter. The power converter 200 includes a reference voltage compensator 202 that is employable to implement the reference voltage compensator 102 of FIG. 1. The reference voltage compensator 202 includes an operational amplifier 204 that further includes a first input 205, a second input 206, and an output 207. The first input 205 is coupled to an output 208 of a voltage divider 210. The voltage divider includes a first resistor 211 that has a first terminal 212 and a second terminal 213. The second terminal 213 of the first resistor 211 is coupled to the output 208 of the voltage divider 210. Also, the voltage divider 210 includes a second resistor 214 that has a first terminal 215 and a second terminal 216. The first terminal 215 of the second resistor 214 is coupled to the output 208 of the voltage divider 210. Also, the first terminal 212 of the first resistor 211 is coupled to an output voltage terminal 118, which is configured to receive an output voltage of the power converter 200. Moreover, the second terminal 216 of the second resistor 214 is coupled to a an electrically neutral terminal 217. In some examples, the electrically neutral terminal 217 is coupled to a common pin 220. Accordingly, the output 208 of the voltage divider 210 produces a voltage feedback signal that is provided to the first input 205 of the operational amplifier 204.

The second input 206 of the operational amplifier 204 is coupled to a voltage reference terminal 222. The voltage reference terminal 222 is further coupled to a bandgap voltage reference (VBG) 223. The VBG 223 is employable to implement the VBG 126 of FIG. 1. The VBG 223 includes a resistor 224 that has a first terminal 225 coupled to the voltage reference terminal 222. A second terminal 226 of the resistor 224 of the VBG 223 is coupled to a cathode 227 of a direct current (DC) power source 228. In some examples, the DC power source 228 is configured to supply a constant voltage source to the voltage reference terminal 222. Also, in some examples, the resistor 224 of the VBG 223 represents an internal resistance of the DC power source 228. An anode 229 of the DC power source 228 is coupled to an analog ground (AGND) terminal 240. A reference resistor divider 232 is also coupled to the voltage reference terminal 222. The reference resistor divider 232 includes a first resistor 233 having a first terminal 234 coupled to the voltage reference terminal 222. A second terminal 235 of the first resistor 233 is coupled to a reference resistor divider terminal 236. The reference resistor divider 232 further includes a second resistor 238 coupled to the reference resistor divider terminal 236 and to the AGND terminal 240. Accordingly, the reference resistor divider 232 and the VBG 223 are arranged in parallel. Together, the reference resistor divider 232 and the VBG 223 generate a reference voltage at the voltage reference terminal 222.

The operational amplifier 204 generates an error compensation voltage at the output 207 by performing a combination on the voltage feedback signal received at the first input 205 and the reference voltage received at the second input 206. The output 207 of the operational amplifier 204 is coupled to an error compensation terminal 242 that receives the error compensation voltage. The error compensation terminal 242 is coupled to a first terminal 243 of a capacitor 244. A second terminal 245 of the capacitor is coupled to the AGND terminal 240.

Also, a first input 246 of a comparator 247 is coupled to the error compensation terminal 242. Accordingly, the first input 246 of the comparator 247 is configured to receive the error compensation voltage from the error compensation terminal 242. The comparator 247 further includes a second input 248 and an output 249. The second input 248 of the comparator 247 is coupled to an output 250 of a combination unit 251. The combination unit 251 includes a first input 252 coupled to a slope compensation terminal 253. The slope compensation terminal 253 provides a square signal to the combination unit 251. The combination unit 251 also includes a second input 254 that is coupled to an input voltage terminal 255, so the second input 254 of the combination unit 251 receives a current sense of the input voltage. Accordingly, the combination unit 251 injects a slope compensation current provided at the slope compensation terminal 253 with the current sense of the input voltage received at the second input 254. Accordingly, the slope compensation terminal 253 provides a square signal that is employed by the combination unit 251 to stabilize current variations sensed in the input voltage at the input voltage terminal 255. Thus, the output 250 of the combination unit 251 provides a stabilized input current to the second input 248 of the comparator 247.

The output 249 of the comparator 247 is coupled to an input 256 of a controller 257. The controller 257 can control a high-side effect transistor (FET) 258. The high-side FET 258 has an input 259 (e.g., a drain) coupled to the input voltage terminal 255 to receive the input voltage. An output 260 (e.g., a source) of the high-side FET 258 is coupled to an output terminal 261. Also, the controller 257 controls a low-side FET 262 that has an input 263 (e.g., a drain) coupled to the output terminal 261. The low-side FET 262 has an output 264 (e.g., a source) that is coupled to a power ground (PGND) terminal 265. Also, the PGND terminal 265 is coupled to the second terminal 245 of the capacitor 244, as well as the AGND terminal 240. The controller 257 provides a first control signal to a control terminal (e.g., a gate) of the high-side FET 258 and a second control signal to a control terminal (e.g., a gate) of the low-side FET 262. The first control signal and the second control signals are complementary signals, so the high-side FET 258 is turned on during intervals where the low-side FET 262 is turned off, and vice versa. Thus, the controller 257 can adjust the voltage delivered to the output terminal 261 by turning the high-side FET 258 and the low-side FET 262 on and off in an interleaving fashion.

Moreover, the output terminal 261 is also coupled to a first terminal 266 of a first inductor 267. A second terminal 268 of the first inductor 267 is coupled to a first terminal 269 of a second inductor 270. A second terminal 271 of the second inductor 270 is coupled to the output voltage terminal 218. Accordingly, an output voltage at the output voltage terminal 218 is provided to the voltage divider 210 that generates the VFB signal. Thus, the controller 257, the high-side FET 258, the low-side FET 262, the first inductor 267 and the second inductor 270 are employed as a logic power stage 272. In some examples, the logic power stage 272 is employable to implement the logic power stage 160 of FIG. 1.

The second terminal 271 of the second inductor 270 and the output voltage terminal 218 are also coupled to a first terminal 273 of a load resistor 274. The load resistor 27 also has a second terminal 275 that is coupled to the electrically neutral terminal 217. Furthermore, a first terminal 276 of a load capacitor 277 is coupled to the second terminal 268 of the first inductor 267 and the first terminal 269 of the second inductor 270. A second terminal 278 of the load capacitor 277 is coupled to the electrically neutral terminal 217. That is, the load capacitor 277 and the load resistor 274 are arranged in parallel. Together, the load capacitor 277 and the load resistor 274 constitute the load 280. In some examples, the load 280 is employed to implement the load 114 of FIG. 1.

In some examples, only the AGND terminal 240 and the PGND terminal 265 share the common pin 220. In other examples, each of the AGND terminal 240, the PGND terminal 265, the electrically neutral terminal 217, and each of the terminals coupled to the AGND terminal 240, the PGND terminal 265, and the electrically neutral terminal 217 share the common pin 220. Because the common pin 220 shares multiple terminals, the common pin 220 generates a parasitic resistance that induces a voltage drop across the common pin 220. The parasitic resistance is represented by a parasitic resistor 281. Because the AGND terminal 240 is coupled to the common pin 220, the reference voltage generated by the reference resistor divider 232 and the VBG 223 experiences a voltage drop due to the parasitic resistance. Moreover, the voltage divider 210 is also coupled to the electrically neutral terminal 217 that is coupled to the parasitic resistor 281. Also, the voltage divider 210 is coupled to the output voltage terminal 218, which references the electrically neutral terminal 217 coupled to the load 280. Thus, the VFB signal generated by the voltage divider 210 at the output 208 of the voltage divider 210 also experiences a voltage drop. Accordingly, regulating voltage at the load 280, particularly voltage at the output voltage terminal 218, loses accuracy responsive to a voltage drop caused by parasitic resistance of the common pin 220.

Also, parasitic resistance of the common pin 220, represented by a resistor 281, increases responsive to high current. In some examples, the parasitic resistance is increased when the low-side FET 262 turned on by the controller 257. When the low-side FET 262 is turned off by the controller 257, the parasitic resistance decreases. Accordingly, the accuracy of the power converter 200 for load regulation is decreased during intervals that the low-side FET 262 is turn on because of the voltage drop caused by the parasitic resistance of the common pin 220. In other examples, because the VBG 223, the reference resistor divider 232, and the load 280 are coupled to the common pin 220, the reference voltage generated by the VBG 223 and the reference resistor divider 232 does not account for the voltage drop across the common pin 220. Moreover, the voltage drop across the common pin 220 increases proportionally to the current through the load 280, so accuracy of the reference voltage at the voltage reference terminal 222 decreases as current through the load 280 increases.

The reference voltage compensator 202 further includes a switch 290 and a voltage to current (V2I) converter 291 to compensate for the voltage drop caused by the parasitic resistance. The V2I converter 291 includes an input 292 coupled to the error compensation terminal 242. Accordingly, the V2I converter 291 receives the error compensation voltage provided by the output 207 of the operational amplifier 204. The V2I converter 291 is employed to convert the error compensation voltage to an error compensation current. Thus, an output 293 of the V2I converter 291 is coupled to a first terminal 294 of the switch 290. A second terminal 296 of the switch 290 is coupled to the reference resistor divider terminal 236. Therefore, during intervals where the switch 290 is closed, the error compensation current is injected into the reference resistor divider 232 to adjust the reference voltage at the voltage reference terminal 222. Particularly, during intervals that the switch 290 is closed, the reference voltage at the voltage reference terminal 222 is increased. Conversely, during intervals where the switch 290 is open, the reference voltage at the voltage reference terminal 222 is about equal to the voltage supplied by the DC power source 228 of the VBG 223. Unless otherwise stated, in this description, 'about' preceding a value means +/−10 percent of the stated value.

The switch 290 further includes a control terminal 298 that is coupled to the low-side FET 262. Accordingly, during intervals where the low-side FET 262 is turned on, the control signal provide to the control terminal (e.g., a gate) of the low-side FET 262 is also provided to the control terminal 298 of the switch 290 to close the switch 290. Thus, during intervals where the low-side FET 262 is turned on, resulting in a higher voltage drop due to parasitic resistance, the switch 290 also closes and injects the error compensation current into the reference resistor divider 232 to compensate for the voltage drop. Accordingly, during intervals where the controller 257 provides a signal to the low-side FET 262 to turn off, the control signal is also provided to the control terminal 298 of the switch 290 to open the switch 290. In some examples, the voltage drop due to parasitic resistance is insignificant during intervals that the low-side FET 262 is turned off. Thus, by implementing the reference voltage compensator 202, load regulation is improved by compensating for the voltage drop induced by parasitic resistance at the common pin 220. In other examples, the control terminal 298 of the switch is coupled to a pulse width modulation (PWM) generator or another component that produces a square wave. Accordingly, the switch 290 is employed to be controlled to adjust the reference voltage in a manner that compensates for voltage drop experienced at the output voltage terminal 218.

Figure 3:
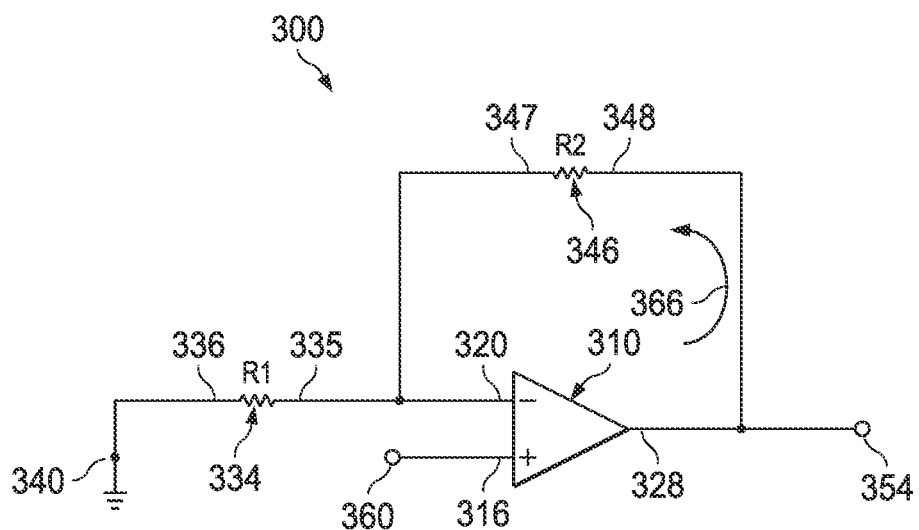
FIG. 3 is a circuit diagram of a voltage to current (V2I) converter.

FIG. 3 illustrates a circuit diagram of an example voltage to current (V2I) converter 300. The V2I converter 300 is employable to implement the V2I converter 181 of FIG. 1 and/or the V2I converter 291 of FIG. 2. The V2I converter 300 includes an operational amplifier 310 that has a non-inverting terminal 316, an inverting terminal 320, and an output terminal 328. The V2I converter 300 further includes a first resistor (R1) 334 that has a first terminal 335 coupled to the inverting terminal 320 and a second terminal 336 coupled to an electrically neutral terminal 340. The V2I converter also includes a second resistor (R2) 346 that has a first terminal 347 that is coupled to the inverting terminal 320 of the operational amplifier and the first terminal 335 of the first resistor 334. A second terminal 348 of the second resistor 346 is coupled to the output terminal 328 of the operational amplifier 310. Accordingly, the output terminal 328 of the operational amplifier 310 and the second terminal 348 of the second resistor 346 are coupled to an output terminal 354. Also, the non-inverting terminal 316 of the operational amplifier 310 is coupled to an input terminal 360.

The input terminal 360 has input voltage (Vi) that is applied to the non-inverting terminal 316 of the operational amplifier 310. The input terminal 360 is employable to implement the error compensation terminal 144 of FIG. 1, so the input voltage (Vi) received by the non-inverting terminal 316 of the operational amplifier 310 is an error compensation voltage. Accordingly, the output terminal 354 is employable to be coupled to a switch 180 of FIG. 1. An output current 366 (Io) provided to the output terminal 354 is a function of the input voltage (Vi) provided at the non-inverting terminal 316 of the operational amplifier 310. Particularly, the output current 366, Io is equal to the input voltage, Vi over the resistance of the first resistor 334. Thus, the V2I converter 300 converts an input voltage Vi to an output current 366, Io.

Figure 4:
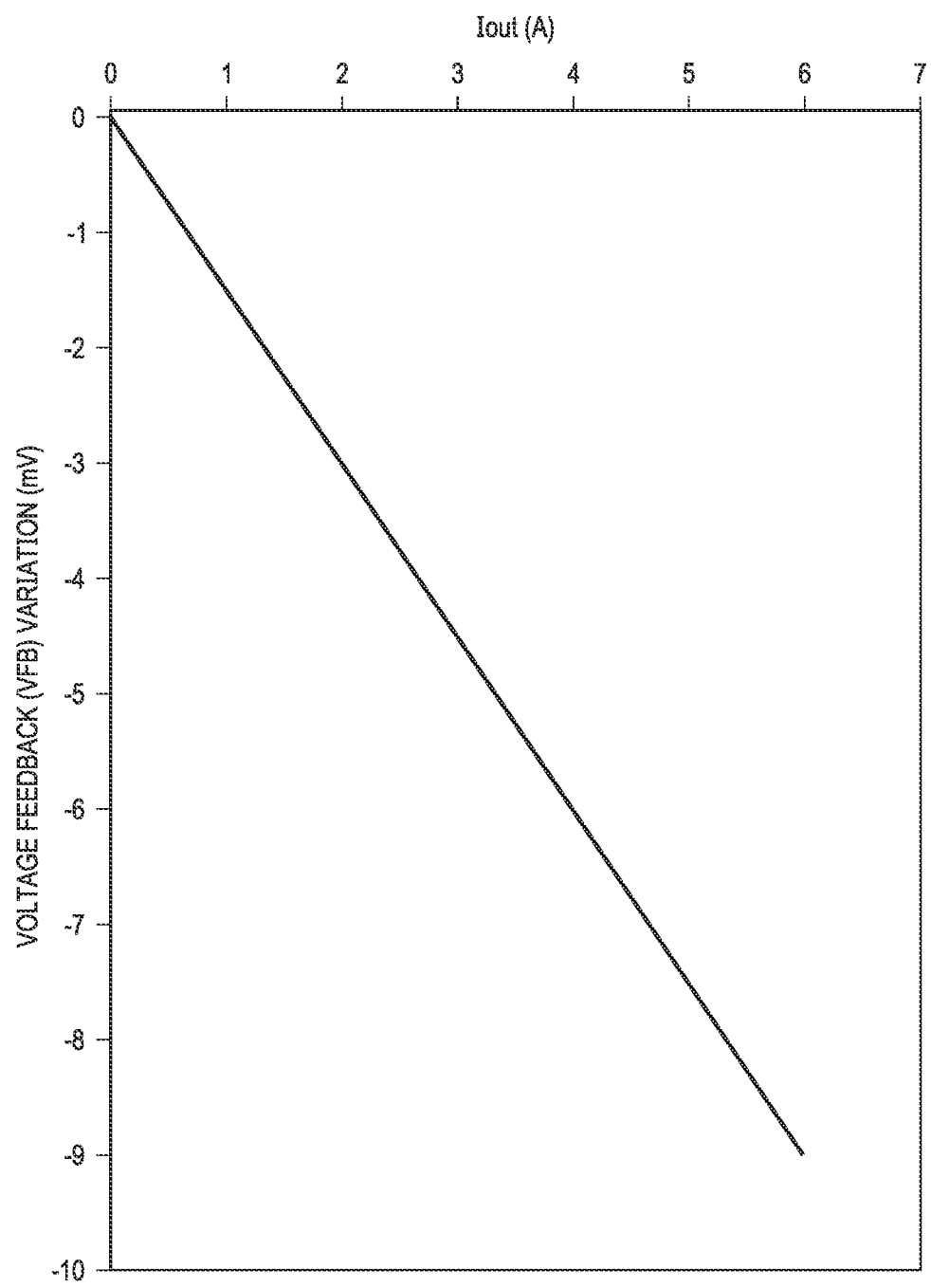
FIG. 4 is a graph that plots a variation of the voltage feedback (VFB) signal in millivolts (mV) as a function of current in amperes (A).

FIG. 4 is a graph that plots a variation of the voltage feedback (VFB) signal in millivolts (mV) as a function of current in amperes (A). Particularly, the VFB signal is the signal provided by an output of the voltage divider (e.g., the voltage divider 110 of FIG. 1) Accordingly, the VFB voltage variation displayed on the Y-axis is the VFB signal voltage in millivolts (mV). The current (Iout) is the output current through a load, such as the load 114 of FIG. 1 displayed in amperes (A). Because the load and the voltage divider are also coupled to a common pin, the VFB signal produced by the voltage divider is susceptible to the parasitic resistance of the common pin. Therefore, the parasitic resistance of the common pin produces a voltage drop on the VFB signal. In an example of the illustration of FIG. 4, a logic power stage can include a continuous time error amplifier with a low pass filter. Also, or alternatively, a low-side FET of the logic power stage is kept off. Particularly, the common pin can have a high parasitic resistance of 5 milli-Ohms (mOhms). As a result, an output current of 4 A, for example, results in a −6 mV drop on the VFB signal. However, the graph of FIG. 4 illustrates a variation in the VFB signal as a function of current in a converter that does not have a reference voltage compensator, such as the reference voltage compensator 102 of FIG. 1 or the reference voltage compensator 202 of FIG. 2. Thus, the voltage drop in the VFB variation constantly decreases as output current increases.

FIG. 5 illustrates a graph that plots load regulation, in percentage (%) as a function of output current, in amperes (A) for a circuit driving a load. Particularly, FIG. 5 plots load regulation as a function of output current in a converter that implements a reference voltage compensator. Accordingly, if the input voltage is 24 V, the load regulation % is about 0.35% when the output current is at 0.1 A. As the current increases to 3.1 A at an input voltage of 24 V, the load regulation % is about −0.3%. Also depicted in FIG. 5 is an input voltage of 12 V. That is, when the input voltage is 12 V, load regulation % is about 0.25% when output current is 0.1 A. As the current increases to 3.1 A when the input voltage is 12 V, the load regulation % drops to about −0.21%. Also depicted in FIG. 5 is a target line for load regulation %, which is between 0.5% and 0%. As current varies, however, load regulation in a converter that does not employ a reference voltage compensator cannot be between 0.5% and 0% due to voltage drop caused by parasitic resistance of a common pin. As current becomes higher, as illustrated in FIG. 4, the worse load regulation % becomes responsive to the higher current. Accordingly, as illustrated in FIG. 5, employment of a reference voltage compensator, such as the reference voltage compensator 102 of FIG. 1 or the reference voltage compensator 202 of FIG. 2 are applied to improve load regulation to a level about equal to the level represented by the target line. More specifically, by intermittently injecting an error compensation current to adjust a voltage reference supplied to the same operational amplifier as the VFB signal, the load regulation % is improved to reach the target line.

FIG. 6 illustrates a graph that plots Voltage Feedback (VFB), in millivolts (mV) as a function of output current, in Amperes (A). Particularly, VFB switching (e.g., dashed line) plots the VFB as a function of output current in a converter without a reference voltage compensator. Accordingly, VFB switching decreases from 801.1 mV at 1 A to 798.5 mV at 3 A. That is, the VFB of the VFB switching without a reference voltage compensator decreases by about 2.6 mV as current increases from 1 A to 3 A. In contrast, the VFB switching compensated (e.g., the solid line) plots the VFB as a function of output current in a converter with a reference voltage compensator, such as the reference voltage compensator 102 of FIG. 1 or the reference voltage compensator 202 of FIG. 2. Accordingly, VFB switching compensated varies between 802.4 mV at an output current of 1 A and 802.6 at an output current of 3 A. That is, the VFB of the VFB switching compensated that employs a reference voltage compensator experiences a variation in VFB of about 0.2 mV. Particularly, the VFB remains nearly constant responsive to the reference voltage compensator that compensates for voltage drop due to parasitic resistance. Moreover, the variation in the VFB compensated is within 0.5%, which is consistent with the load regulation percentage range illustrated in FIG. 5.

Figure 7:
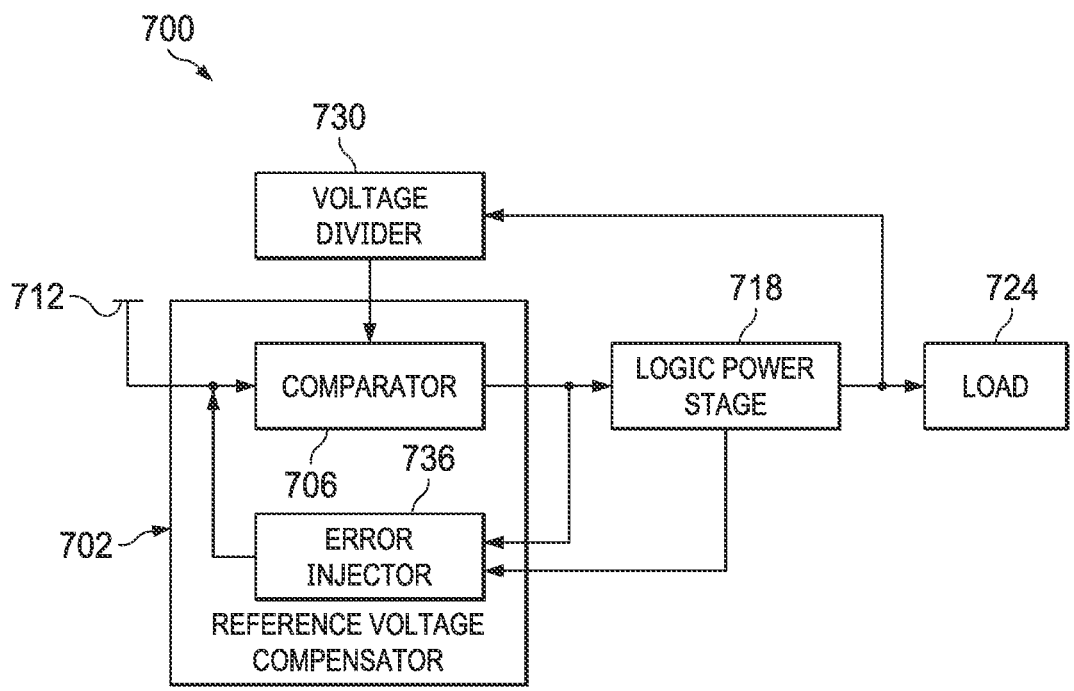
FIG. 7 illustrates a block diagram that provides an example application for a converter that implements a reference voltage compensator.

FIG. 7 illustrates a block diagram that provides an example application for a converter 700 that implements a reference voltage compensator 702. The reference voltage compensator 702 includes a comparator 706 having a reference voltage input coupled to a constant DC source 712. The comparator 706 also includes a voltage feedback input. An output of the comparator 706 provides an error compensation voltage based on the voltages received at the reference voltage input and the voltage feedback input, which is provided to an input of a logic power stage 718. The logic power stage 718 also includes an output to supply power to an input of a load 724 and to a voltage divider 730. Accordingly, an output of the voltage divider 730 is further coupled to voltage feedback input of the comparator 706. Because many components of the converter 700, such as the logic power stage, load, and converter are coupled to a common pin, the common pin induces a parasitic resistance.

Responsive to the parasitic resistance, a voltage drop is experienced at the output voltage, which propagates to the voltage feedback input of the comparator 706. The voltage drop increases when the logic power stage 718 has a high current state and decreases when the logic power stage 718 has a low current state. To compensate for the voltage drop, an error injector 736 adjusts the voltage provided to the reference voltage input of the comparator 706. Particularly, the error injector 736 (e.g., a combination of a V2I converter and a switch, such as the V2I converter 181 and the switch 180 of FIG. 1) has a control input coupled to the logic power stage 718 to receive a control signal indicating the state of the logic power stage 718. The error injector 736 also includes an error voltage input coupled to the output of the comparator 706 to receive the error compensation voltage. Accordingly, during intervals that the logic power stage 718 is operating in a high current state, the error injector 736 injects the error compensation current into the voltage reference input of the comparator 706. Conversely, when the logic power stage 718 is operating in a low current state, the error injector 736 does not inject the error compensation current into the voltage reference input of the comparator 706.

Modifications are possible in the described embodiments, and other embodiments are possible, within the scope of the claims.

What is claimed is:

1. A device comprising:
   an operational amplifier having a first input, a second input and an output, the first input adapted to be coupled to a first terminal, and the operational amplifier configured to generate a first signal at the output;
   a reference resistor divider having a first resistor and a second resistor, a first terminal of the first resistor is coupled to the second input of the operational amplifier, a second terminal of the first resistor is coupled to a first terminal of a second resistor and a second terminal of the second resistor coupled to an electrically neutral terminal;
   a voltage to current (V2I) converter having an input and an output, the input coupled to the output of the operational amplifier, and the V2I converter configured to generate a second signal at the output of the V2I converter;
   a switch coupled to the output of the V2I converter and to the second terminal of the first resistor of the reference resistor divider; and
   a bandgap voltage reference (VBG) source having a negative terminal coupled to the electrically neutral terminal and a positive terminal coupled to the second input of the operational amplifier.

2. The device of claim 1, wherein the output of the operational amplifier is coupled to an input of a comparator.

3. The device of claim 1, wherein the V2I converter converts voltage at the output of the operational amplifier to current.

4. The device of claim 1, wherein a control terminal of the switch is coupled to a control terminal of a low-side field effect transistor (FET) of a logic power stage.

5. The device of claim 4, wherein the electrically neutral terminal is an analog ground (AGND) terminal adapted to be coupled to a power ground (PGND) terminal.

6. The device of claim 5, wherein the AGND terminal and the PGND terminal are coupled via a common pin.

7. The device of claim 6, wherein the device adjusts voltage at the second input of the operational amplifier responsive to a voltage drop caused by a parasitic resistance across the common pin.

8. The device of claim 7, wherein the common pin is adapted to be coupled to a load.

9. The device of claim 8, wherein a voltage at the output of the operational amplifier is proportional to the output current of the V2I converter.

10. The device of claim 8, wherein the voltage at the load is regulated by injecting the output current of the V2I converter into the reference resistor divider by intermittently adjusting the switch responsive to a control signal provided to the control terminal of the low-side FET.

11. A device comprising:
- an operational amplifier comprising:
  - a first input configured to receive a voltage feedback signal;
  - a second input coupled to a voltage reference terminal and configured to receive a reference voltage, and the operational amplifier configured to generate an error compensation voltage at an output of the operational amplifier, responsive to the voltage feedback signal and the reference voltage;
- a reference resistor divider comprising:
  - a first terminal of a first resistor coupled to the voltage reference terminal and a second terminal of the first resistor coupled to a reference resistor divider terminal; and
  - a first terminal of a second resistor coupled to an analog ground (AGND) terminal and a second terminal of the second resistor coupled to the reference resistor divider terminal;
- a voltage to current (V2I) converter configured to receive the error compensation voltage and to convert the error compensation voltage into an error compensation current;
- a switch coupled between the V2I converter and the second terminal of the first resistor of the reference resistor divider, the switch being configured to intermittently inject the error compensation current into the second terminal of the first resistor of the reference resistor divider based on a control signal; and
- a bandgap voltage reference (VBG) source configured to generate the reference voltage.

12. The device of claim 11, further comprising a power ground (PGND) terminal adapted to be coupled to the AGND terminal and a load via a common pin, wherein the common pin generates a parasitic resistance.

13. The device of claim 12, wherein the switch is adapted to be coupled to a controller of a logic power stage configured to transmit the control signal to the switch.

14. The device of claim 13, wherein the logic power stage further comprises:
- a high-side field effect transistor (FET) having an input coupled to a power supply and an output coupled to the load; and
- a low-side FET having an input coupled to the load and an output coupled to the common pin.

15. The device of claim 14, wherein the control signal is a square wave that opens the switch responsive to an off state of the low-side FET of the logic power stage and closes the switch responsive to an on state of the low-side FET of the logic power stage to compensate the reference voltage for the parasitic resistance of the common pin.

16. The device of claim 15, further comprising a comparator having a first input coupled to the output of the operational amplifier, a second input coupled to the power supply, and an output coupled to an input of the logic power stage.

17. A device comprising:
- a reference voltage compensator comprising:
  - an operational amplifier having a first input, a second input and an output, the first input adapted to be coupled to a first terminal, and the operational amplifier configured to generate a first signal at the output;
  - a reference resistor divider having a first resistor and a second resistor, a first terminal of the first resistor is coupled to the second input of the operational amplifier, a second terminal of the first resistor is coupled to a first terminal of a second resistor and a second terminal of the second resistor coupled to an electrically neutral terminal;
  - a voltage to current (V2I) converter having an input and an output, the input coupled to the output of the operational amplifier, and the V2I converter configured to generate a second signal at the output of the V2I converter;
  - a switch coupled to the output of the V2I converter and to the second terminal of the first resistor of the reference resistor divider, wherein a control terminal of the switch is configured to receive a control signal to control a state of the switch;
  - a bandgap voltage reference (VBG) source having a negative terminal coupled to the electrically neutral terminal and a positive terminal coupled to the second input of the operational amplifier; and
- a logic power stage comprising:
  - a controller;
  - a high-side field effect transistor (FET) controlled by the controller having an input coupled to a power supply and an output; and
  - a low-side FET controlled by the controller having an input coupled to the output of the high-side FET and an output coupled to the electrically neutral terminal, wherein the control terminal of the switch is coupled to a control terminal of the low-side FET to receive the control signal from the controller.

18. The device of claim 17, wherein the device further comprises:
- a load having a first terminal adapted to be coupled to the output of the high-side FET and the input of the low-side FET and a second terminal adapted to be coupled to the electrically neutral terminal, wherein the electrically neutral terminal is a common pin.

19. The device of claim 18, wherein the switch closes responsive to receiving the control signal from the low-side FET that indicates the low-side FET is turned on and opens responsive to receiving the control signal from the low-side FET that indicates the low-side FET is turned off to compensate for voltage drop responsive to parasitic resistance of the common pin.

20. The device of claim 19, wherein the logic power stage is a current mode switching regulator.

* * * * *